Figure 5:
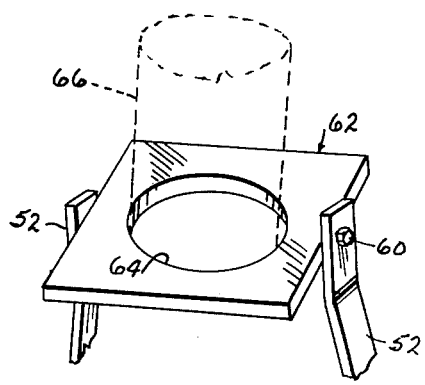

July 14, 1964 E. F. CARPENTER 3,140,856
CABLE PULLER
Filed Oct. 22, 1962 2 Sheets-Sheet 1

EDWARD F. CARPENTER
*INVENTOR.*

BY
*Robert K. Shea*
AGENT

INVENTOR.
EDWARD F. CARPENTER

United States Patent Office 3,140,856
Patented July 14, 1964

3,140,856
CABLE PULLER
Edward F. Carpenter, 8205 NW. 23rd,
Oklahoma City, Okla.
Filed Oct. 22, 1962, Ser. No. 232,030
2 Claims. (Cl. 254—134.3)

The present invention relates to the art of installing electric wiring and more particularly to a device for pulling electrical cables through a conduit.

The present invention is an improvement over Patent No. 2,896,911, issued to me July 28, 1959, for Cable Puller.

It is generally recognized in the electrical contracting trade that a large portion of the cost of installing electric wiring or rewiring an old building is the labor cost of the number of man hours time necessary for pulling or threading electric cables through the conduit. In some instances the wires must be pulled through conduit which includes one or more 90° bends thereby greatly increasing the frictional resistance between the wires and the conduit. For example, some wiring installations require the use of four number 4-0 wires which are shielded by a two inch diameter conduit. Wires of this gauge are of such size that they occupy a greater portion of the bore of the conduit thereby requiring considerable force or "pull" to install the wires in the conduit. Such a wire threading or cable pulling device is disclosed in the above mentioned patent. This device has operated quite satisfactorily but has a greater mass than is desirable. Most of the cable pulling devices revealed by the prior art, with the exception of the above mentioned patent, are rather bulky and complicated in construction resulting in a device which is too expensive for the small business electrical contractor to include in his equipment.

The principal object of this invention is to provide a compact device for pulling electrical wiring through conduit which is formed of relatively few parts and may be easily used by one operator.

Another object is to provide a cable puller of relatively small size which includes a gear ratio rendering the device capable of being used on electrical wiring installations of any size.

A further object is to provide a device of this class which is geared for pulling heavy loads at a relatively low rate of travel.

Still another object is to provide a device of this class which features a flexible element connected to a reel wherein the reel may be selectively disengaged from its driving means when unwinding the flexible element.

A still further object is to provide a device of this class which includes means for transferring the frictional resistance between the cable and the conduit to the end of the conduit containing the cable.

The present invention accomplishes these and other objects by providing a base having upright parallel spaced-apart support members journaling a reel. An electric motor, pivotally mounted on the base, is removably engaged with the reel for selectively driving or releasing the latter.

Figure 4:
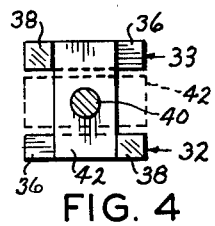
Figure 1:
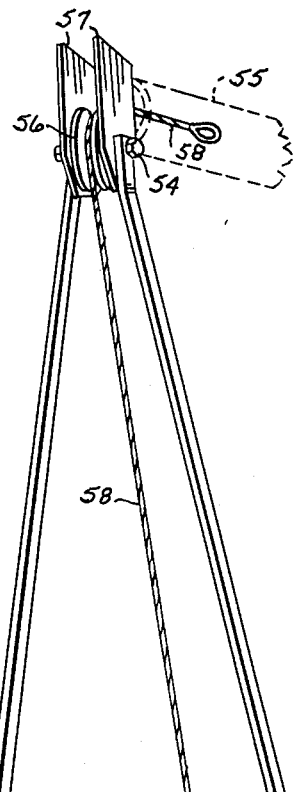
Figure 2:
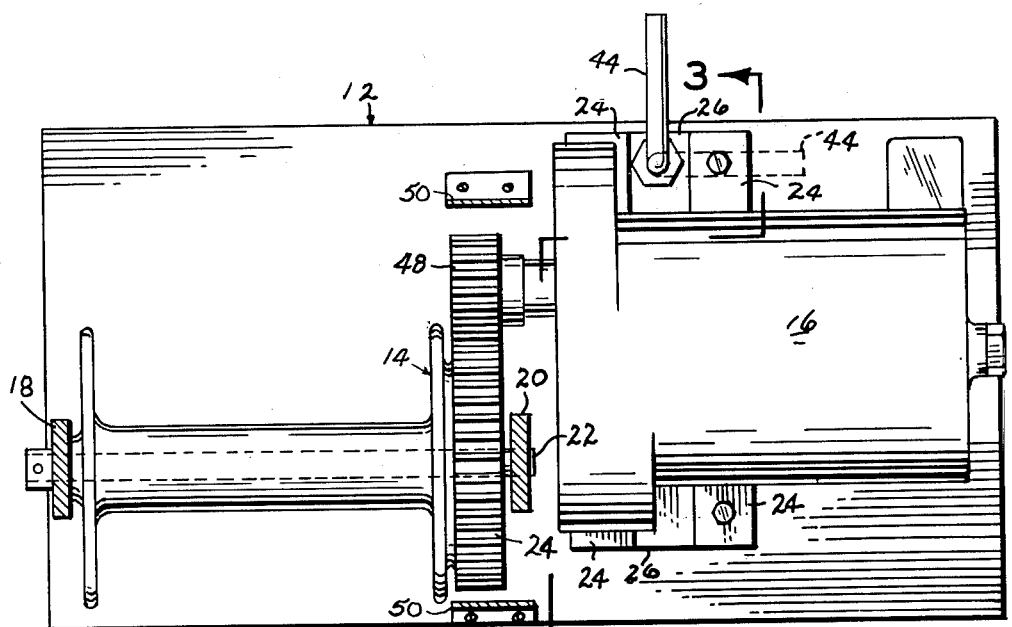
Figure 3:
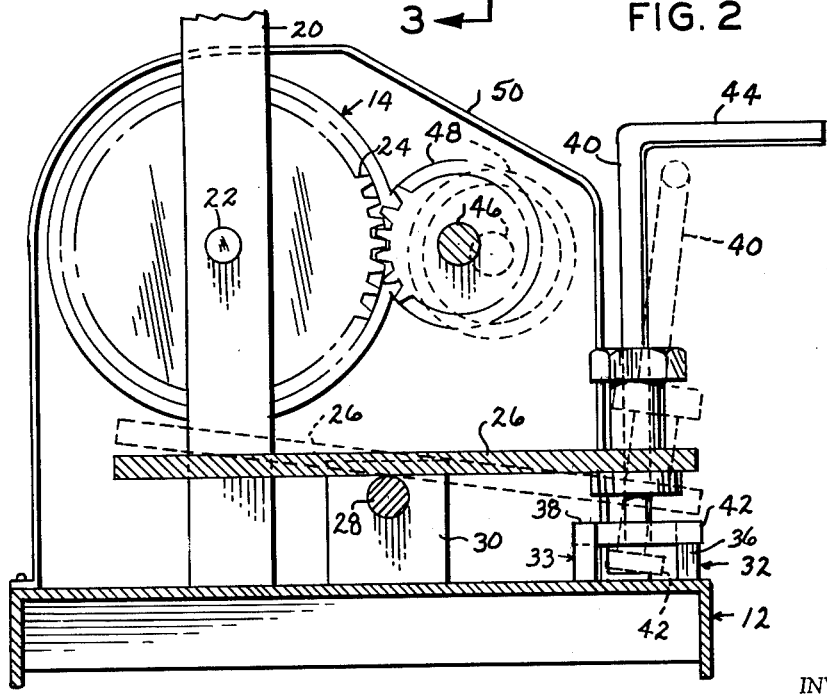

Other objects will be apparent from the following description when taken in conjunction with the accompanying two sheets of drawings, wherein:

FIGURE 1 is a perspective view of the device;
FIGURE 2 is a top plan view, partly in cross-section, taken substantially along the line 2—2 of FIG. 1;
FIGURE 3 is a vertical cross-sectional view taken substantially along the line 3—3 of FIG. 2, illustrating, by dotted lines, the pivoting movement of the motor support;
FIGURE 4 is a horizontal cross-sectional view, partly in elevation, taken substantially along the line 4—4 of FIG. 3; and,
FIGURE 5 is a fragmentary perspective view of a conduit engaging bracket of the device.

Like characters of reference designate like parts in those figures of the drawings in which they occur.

In the drawings:

The reference numeral 10 indicates the device, as a whole, including a substantially rectangular horizontally disposed base 12 having a reel 14 and a motor 16 and gear unit mounted thereon. A pair of support memmbers 18 and 20 are connected at one end in parallel vertical spaced relation to the upper surface of the base 12 adjacent one longitudinal side edge. A shaft 22 extends horizontally between the supports 18 and 20 and journals the drum or reel 14. A toothed gear 24 is integrally connected coaxially to one end of the reel 14.

The electric motor 16 is provided with a mounting base 25 which is secured to a rectangular plate 26. The plate 26 extends transversely of the base 12 and is integrally connected intermediate its ends to a horizontal pivot shaft 28 longitudinally aligned, in off-set relation with the axis of the reel 14. The respective ends of the pivot shaft 28 are supported by a pair of upstanding brackets 30 secured to the upper surface of the base 12 for pivoting movement of the free end portions of the plate 26 toward and away from the base. A pair of pillow blocks 32 and 33 are secured in parallel spaced relation to the upper surface of the base 12 adjacent its longitudinal side opposite the reel 14 and beneath the adjacent end portion of the plate 26. The pillow blocks each have an upper surface 34 parallel with the upper surface of the base 12 and oppositely positioned beveled or inclined surfaces 36 at the respective ends thereof. The end portion of each of the pillow blocks opposite the inclined surfaces 36 has an upstanding shoulder 38 forming oppositely positioned stops for the purposes which will presently be apparent.

A pin 40 extends vertically through the end portion of the plate 26 centrally positioned above the blocks 32 and 33 and is secured at its depending end to a rectangular shoe 42 which contacts the upper surface 34 of the respective pillow block. The upper end portion of the pin 40 is turned outwardly in right angular relation to its vertical axis to form a handle portion 44 for rotating the pin and shoe about the vertical axis of the pin.

The motor 16 is provided with a drive shaft 46 having its axis off-set with respect to the longitudinal axis of the motor (FIG. 2) to which a pinion 48 is coaxially connected. The pinion 48 engages the gear 24 for rotating the latter in response to the rotation of the motor.

An upstanding sheet metal guard 50, secured to the base 12, shields the gear 24 and pinion 48. A pair of elongated arms 52 is connected at one end respectively to the upper end portion of the supports 18 and 20 in outwardly converging relation. The free end portions of the arms 52 are interconnected transversely by a bolt 54 which journals a pulley 56 between a pair of conduit or junction box contacting brackets 57. A flexible element, such as a cable 58, is secured at one end to the reel 14 and entrained over the pulley 56 for connection by its free end portion to electrical cable, or the like, not shown, to be pulled through a conduit 55.

Alternatively the free end portion of the arms 52 may be connected to suitable threaded lugs 60 projecting oppositely outward from opposing sides of a rectangular plate member 62. The plate member 62 is centrally apertured, as at 64, a selected diameter for surrounding the free end portion of a conduit 66 through which cable is to be pulled.

A handle member 68, connected to the free end portion of the support 20, permits the entire device to be picked up and carried by the operator.

*Operation*

In operation the device 10 is positioned adjacent the opening of a junction box, not shown, or the open end of the conduit 55 or 66. The motor is connected to a source of electrical energy, not shown, by wires 70 through a switch 72. The pin handle 44 is manually rotated to position its axis parallel with the axis of the motor 16 which rotates the shoe 42 out of engagement with the upper surfaces 34 of the pillow blocks 32 and 33 and positions the shoe between the blocks as shown by dotted lines (FIG. 4). This pivots the adjacent end portion of the plate 26 downwardly toward the upper surface of the base 12, as shown by dotted lines (FIG. 3), and similarly pivots the motor 16 downwardly and breaks the toothed contact between the pinion 48 and gear 24. This permits free rotation of the reel 14 for unwinding the cable 58 therefrom. The free end portion of the cable is pulled through the conduit and connected with the electrical cable to be pulled through the conduit. The motor 16 is then manually raised to engage the pinion 48 with the gear 24 by rotating the handle 44 which rotates the shoe 42 up the inclined surfaces 36 of the blocks 32 and 33 to its motor supporting position on the pillow blocks and in contact with the stops 38. The motor 16 is then energized which rotates the reel 14 and rewinds the cable 58 thereon. The pin handle 44 is maintained in gear engaged position by a spring 74 connected to the handle 44 and an adjacent end portion of the motor.

Obviously the invention is susceptible to some change or alteration without defeating its practicability, and I therefore do not wish to be confined to the preferred embodiment shown in the drawings and described herein, further than I am limited by the scope of the appended claims.

I claim:

1. An electric cable puller, including: a base; a pair of support members rigidly connected in parallel vertical spaced-apart relation to the upper surface of said base; a reel journaled between said support members in spaced relation with respect to said base; a flexible element secured at one end to said reel and wound on the latter; a gear coaxially connected to one end of said reel; a pair of brackets secured to said base in spaced-apart relation; a shaft journaled by said brackets in parallel off-set relation with respect to the axis of said reel; a rectangular plate secured to said shaft for horizontal pivoting movement of said plate about the axis of said shaft; an electric motor mounted on said plate, said motor having a driving shaft; a pinion coaxially mounted on said driving shaft in contact with said gear for rotating said reel; and pin and pillow block means connected to one end portion of said plate and said base, respectively, for raising and lowering said one end portion of said plate and pivoting said motor about the axis of said shaft and moving said pinion into and out of contact with said gear, said pin and pillow block means comprising a pin pivotally extended through one end portion of said plate with the axis of said pin normal to the plane of said plate, a shoe rigidly connected to the depending end of said pin, and a pair of spaced-apart shoe supporting pillow blocks mounted on the upper surface of said base below said one end portion of said plate, the spacing between said pillow blocks being slightly greater than a transverse dimension of said shoe for removably receiving said shoe therebetween.

2. An electric cable puller, including: a base; a pair of support members rigidly connected in parallel vertical spaced-apart relation to the uper surface of said base; a reel journaled between said support members in spaced relation with respect to said base; a flexible element secured at one end to said reel and wound on the latter; a gear coaxially connected to one end of said reel; a pair of brackets secured to said base in spaced-apart relation; a shaft journaled by said brackets in parallel off-set relation with respect to the axis of said reel; a rectangular plate secured intermediate its ends to said shaft for horizontal pivoting movement of said plate about the axis of said shaft; an electric motor mounted on said plate, said motor having a driving shaft; a pinion coaxially mounted on said driving shaft in contact with said gear for rotating said reel; a pair of pillow blocks mounted on said base in parallel spaced-apart relation adjacent one end portion of said plate, said pillow blocks each having a surface lying in a common plane in spaced relation with respect to the plane of the upper surface of said base; a pin pivotally extended through said plate with the axis of said pin normal to the plane of said plate, one end of said pin projecting toward the space between said pillow blocks; and a rectangular shoe secured to said one end of said pin, the length of said shoe being at least great enough to span the distance between and be supported by said surfaces of said pillow blocks, the width of said shoe being less than the spacing between said pillow blocks, the other end of said pin having a handle for pivoting said pin and rotating said shoe, about the axis of said pin, into and out of supported relation with said surfaces of said pillow blocks and pivoting said motor about the axis of said shaft.

References Cited in the file of this patent

UNITED STATES PATENTS

| | | |
|---|---|---|
| 1,040,120 | Bayer | Oct. 1, 1912 |
| 1,630,540 | Ramsford | May 31, 1927 |
| 2,092,714 | Flygare | Sept. 7, 1937 |
| 2,168,463 | Wunsch | Aug. 8, 1939 |
| 2,286,781 | Abramson et al. | June 16, 1942 |
| 2,948,510 | Kieser | Aug. 9, 1960 |
| 3,072,383 | Vannderhagen | Jan. 8, 1963 |